Patented Aug. 24, 1954

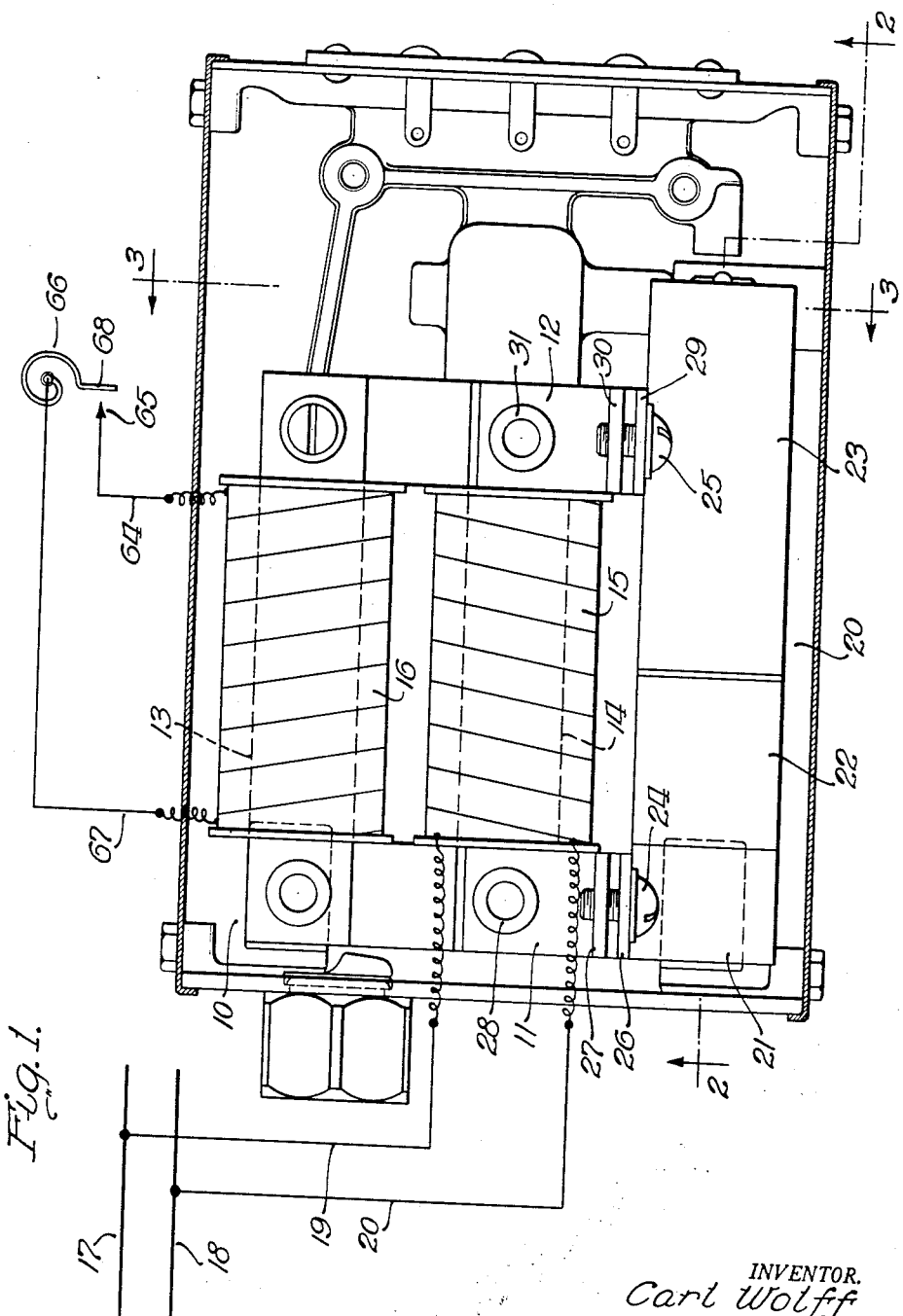

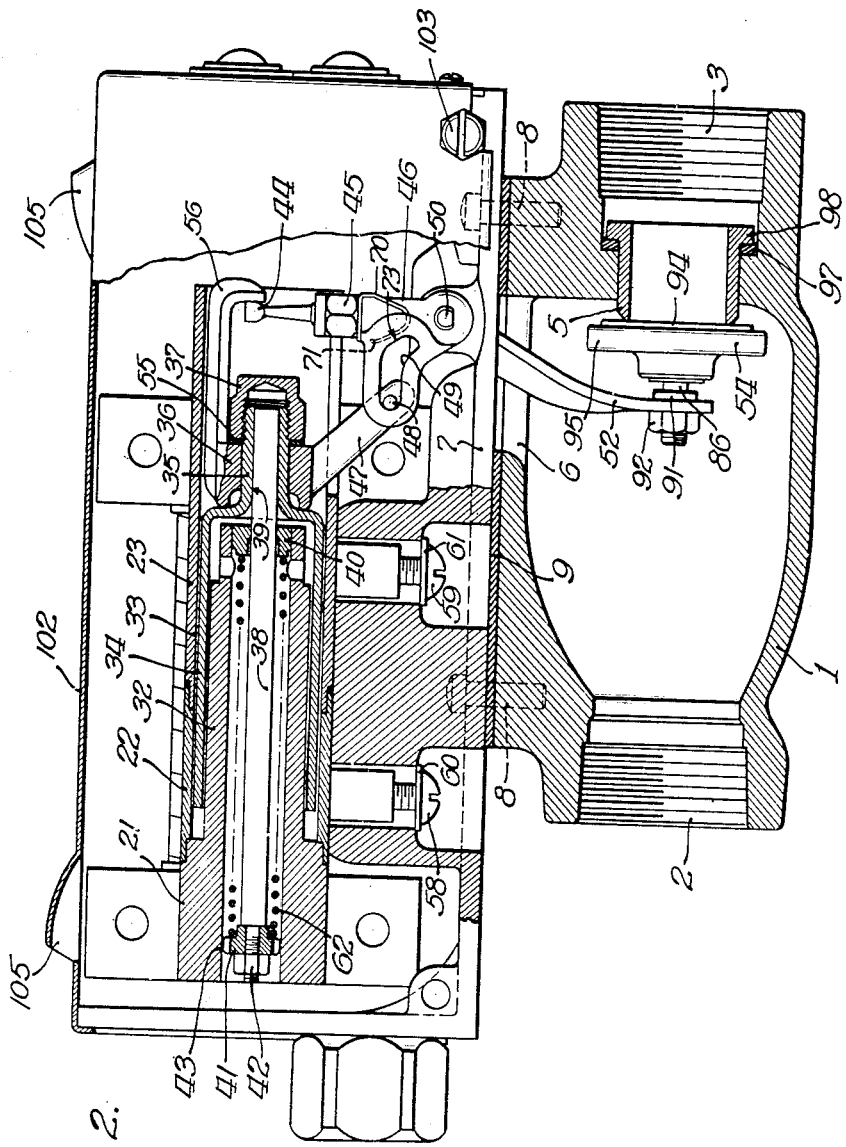

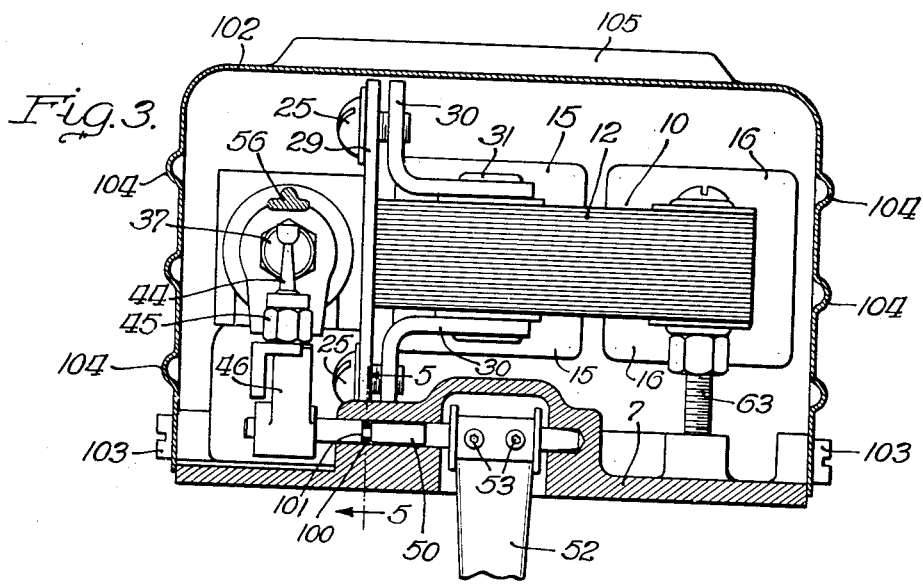
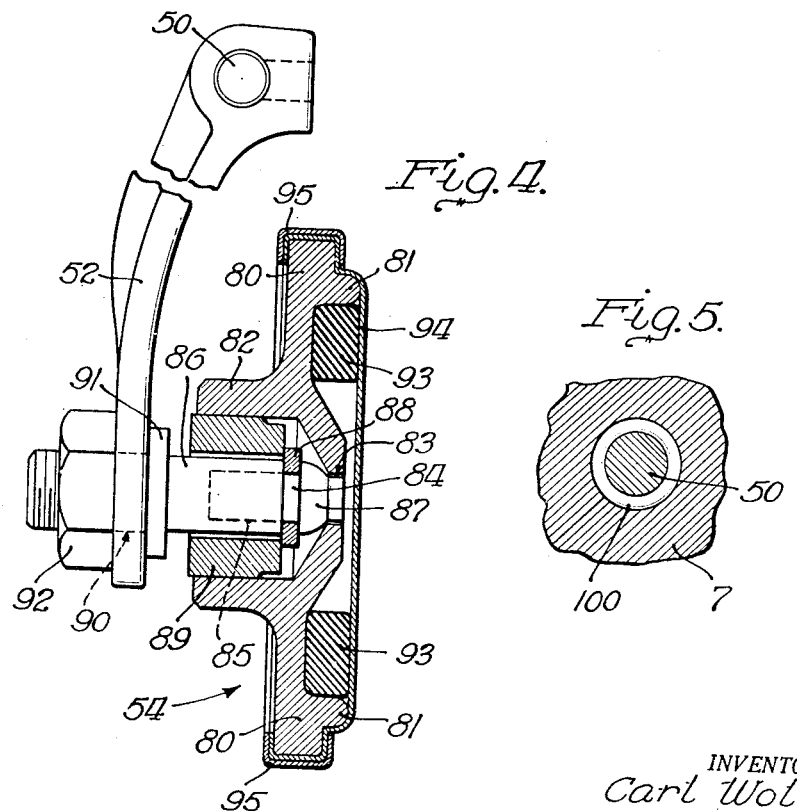

2,687,501

UNITED STATES PATENT OFFICE 2,687,501

ELECTROMAGNETIC CONTROL DEVICE

Carl Wolff, Milwaukee, Wis., assignor to Milwaukee Gas Specialty Company, Milwaukee, Wis., a corporation of Wisconsin Application November 7, 1950, Serial No. 194,505

7 Claims. (Cl. 317—168)

This invention relates, in general, to control devices, and has particular relation to an improved electromagnetic control device.

While the particular device which I shall describe hereinafter in connection with the drawings is adapted for use for controlling a valve or the like for, in turn, controlling a heater or a cooling device or the like, it is to be understood that the device may be used for making, breaking, or changing the connections in one or more electric circuits, or for controlling other devices as suitable or desired.

The present invention may be more particularly characterized as relating to devices of the character disclosed and claimed in the copending application of Gifford I. Holmes and Russell B. Matthews Serial No. 180,482, filed August 19, 1950.

One of the main objects of the present invention is to provide an improved control device wherein the initial operating force which is obtained is a maximum, as distinguished from devices in which the force exerted initially is a minimum. This is advantageous in that it provides a large initial or starting force for overcoming inertia and friction of moving parts, and a strong initial force which, for example, will overcome fluid pressures for operating a valve wherein the controlled fluid—such as gas for a heater—usually tends to hold the valve closed, or which will, for example, overcome the initial inertia and friction in separating a circuit controlling member from the cooperating contact means with which it engages when in closed position.

Another object of the invention is to provide an improved electromagnetically responsive control device utilizing the force of electromagnetic repulsion, whereby to provide a relatively large initial or starting force to provide an action which is positive and effective.

Another object of the invention is to provide lost motion between the actuator of the electromagnetically responsive device and the actuated device to produce a hammer blow effect for establishing the initial movement of the actuated device, and, more particularly, for overcoming any initial inertia and any friction, sticking, or holding of the actuated device in the position from which it is actuated by the electromagnetically responsive device.

Another object of the invention is to provide a device in which relatively great movement is imparted to the actuated device after initiating movement of such device, and more particularly a device in which a hammer blow effect is produced for initiating movement of the actuated device, combined with a relatively large initial mechanical advantage followed by increased movement of the actuated device after its initial actuation.

Another object of the invention is to provide means for eliminating noise in the actuating mechanism between the actuator of the electromagnetically responsive device and the actuated device, and more particularly an improved spring arrangement for absorbing vibrations in such actuating mechanism.

Another object of the invention is to provide an improved electromagnetically responsive control device in which the desired action is obtained by electric induction whereby the effects of residual magnetism are eliminated and the chances of sticking of the device, for example, in an unsafe or undesired position are reduced.

Another object of the invention is to provide a device of simple, compact, and relatively inexpensive construction which will lend itself for controlling a valve, switch, or other controlling device, for example, by a thermostat or other condition responsive device.

Another object of the invention is to provide an improved repulsion type electromagnetically responsive control device comprising a winding provided with a core having a first core portion through which flux established by energization of the winding is adapted to pass, the core having a second core portion provided with an air gap, and there being flux diverting means operable to divert flux from the first core portion to the second core portion and the air gap, and a non-magnetic and conducting member positioned to travel freely in the air gap and in which the electric current is induced with accompanying repulsion of said member by the flux diverted to the second core portion and through the air gap by the flux diverting means.

Another object of the invention is to provide a device in which the core and the windings for establishing and diverting the magnetic flux through the core constitute a current limiting step-down transformer wherein the electric energy produced in a secondary winding may be relatively low and substantially constant so that the secondary circuit and a thermostat or other control device therefor will not be deleteriously affected by the energizing current supplied to the primary winding, and so that the type of insulating conduits required for line voltage conductors are unnecessary.

Another object of the invention is to provide a device which is immune to short circuits on the secondary side of the transformer from the standpoint of damage due to overheating.

Another advantage of the device of the present invention over previous devices is that the stand-by power loss is low; that is, there is lower power consumption when the secondary circuit is not energized. This stand-by loss compares favorably with a conventional current limiting transformer.

Further objects and advantages of the invention will appear from the following detailed description, taken in connection with the accompanying drawings.

In the drawings:

Figure 1 is a plan view of one form of device embodying the present invention, with the cover removed;

Figure 2 is a sectional view partially in elevation, taken through the electromagnetic operator substantially on the line 2—2 of Figure 1, and showing the valve body in section;

Figure 3 is a sectional view taken on the line 3—3 of Figure 1; and

Figure 4 is a detail section taken on the line 4—4 of Figure 3 showing the gas seal means for the shaft which is turned by the electromagnetic operator.

Referring to the drawings, the embodiment of the invention therein illustrated comprises a valve body 1 having a fluid inlet 2 and a fluid outlet 3. A valve member 54 cooperates with a valve seat 5 at the outlet 3 to control the flow of fluid through the valve body; for example, the flow of gaseous fuel to a burner (not shown), or any other fluid. It will be noted that the controlled fluid tends to hold the valve member 54 closed. This may, of course, vary within the scope of the present invention.

The valve body 1 has an opening 6 covered by a plate 7 which is secured in place over the opening 6, for example, by screws 8 (Figure 2). Sealing means 9 is preferably interposed between plate 7 and valve body 1. The plate 7 is preferably formed of high specific resistance non-magnetic material, such as stainless steel.

The particular magnetic core 10 selected for illustration is of generally rectangular configuration, comprising a pair of parallel legs 11 and 12 magnetically connected at spaced locations by parallel legs 13 and 14 disposed at right angles to the legs 11 and 12. An alternating current primary winding 15 is wound around the leg 14, and a secondary winding 16 is wound around the leg 13. It is to be understood, however, that either winding 15 or winding 16 may be the primary winding, and either winding may be the secondary winding without affecting the operation of the device. Electric power for energizing the winding 15 is supplied from a suitable source, for example, from line wires 17 and 18 of a suitable source of alternating current such as a household current supply line of the type which averages about 115 volts. The terminals of the winding 15 are connected to the line wires 17 and 18 by conductors 19 and 20.

A cylinder is made up of square stock, and has a magnetic end 21, a non-magnetic section 22, and a magnetic section 23 separated from the magnetic section 21 by the non-magnetic section 22. The non-magnetic section 22 may be formed of non-magnetic high specific resistance material, such as stainless steel, or any suitable plastic, or other non-magnetic material. The legs 11 and 12 have projecting ends which abut at spaced locations against the magnetic end 21 and magnetic section 23, and are secured thereto, for example, by screws 24 and 25. The screws 24 cooperate with flanges 26 on the magnetic end 21 and with angular brackets 27 secured to the core 10 at 28. The screws 25 cooperate with flanges 29 on magnetic section 23 and with angular brackets 30 secured to core 10 at 31. The magnetic end 21 has an integral magnetic sleeve 32 which extends through the tubular non-magnetic section 22 and into the tubular magnetic section 23 with an annular space or air gap 33 therebetween.

A non-magnetic and electric conducting cup or sleeve 34 is free to travel in the annular air gap 33. The sleeve 34 is preferably made of electrolytic copper of high conductivity, and is necked or gathered in at one end to form a neck 35 of reduced diameter. An actuating member 36 is secured on neck 35 by a nut 37. A guide stem 38 is pressed-fitted as at 39 in the neck 35. The guide stem 38 rides in a bearing 40 press-fitted to the sleeve 32 at its right hand end as the device is shown in Figure 2. A bearing 41 is secured by a nut 42 to the left hand end of the guide stem 38. The bearing 41 may be formed of gear pinion stock, and has a smooth radius 43 to permit of low friction motion for the stem 38.

With the parts positioned as shown in Figure 2, the nut 37 is spaced from a projecting stem 44 to provide lost motion therebetween for a purpose which will presently appear. The stem 44 is screwed and secured by a nut 45 to a crank 46. The actuating member 36 has an arm 47 which carries a pin 48. The pin 48 operates in a slot 49 in the crank 46 as will be hereinafter more fully described. The crank 46 is splined or keyed on an actuator shaft 50 which projects laterally from the position of the electromagnetic operator as shown in Figure 3, and has a valve operating arm 52 staked or otherwise secured to the shaft 50 at 53 so that turning of the shaft 50 will swing the arm 52 to open and close the valve 54. The position of the nut 37 relative to the stem 44 may be adjusted by replacing the lock shim 55 with lock shims of different thickness, or by using a plurality of shims.

The actuating member 36 may have an integral hook 56 for cooperation with the stem 44 in closing the valve 54 as will hereinafter appear. Screws 58 and 59, provided with suitable washers 60 and 61 respectively, attach non-magnetic section 22 and magnetic section 23 to the plate 7. Upon the absence of substantial magnetic flux in the gap 33, a spring 62 coiled about the stem 38 and acting against the bearings 40 and 41 urges the stem 38, and accordingly the sleeve 34, toward the left as the device is shown in Figure 2. Additional support for the magnetic core 10 on the plate 7 may be provided by threaded posts 63, one of which is shown in Figure 3.

One end of the secondary winding 16 may be connected by a conductor 64, for example, with a fixed contact 65 of a thermostat 66. A conductor 67 connects the other terminal 68 of the thermostat 66 to the other end of the secondary winding 16. The thermostat 66 may be positioned in a room or other space, or it may be placed where it will be subject to the temperature of a heater, or otherwise disposed as desired. It is also contemplated that the device 66, instead of being a temperature responsive thermostat, may be any other condition responsive means or other device for opening and closing the circuit of the secondary coil 16, as suitable or desired.

For the purpose of eliminating noise in the actuating mechanism between the actuator of the electromagnetically responsive device and the actuated device, a spring 70 is provided. This spring 70 may be in the form of a leaf spring of beryllium copper or other suitable material. It is fastened at one end between the nut 45 and crank 46, and has a V-shaped portion the free leg 71 of which is positioned for engagement with the pin 48 in the valve closing operation. When the actuator moves to the right from the position shown in Figure 2 the pin 48 contacts the spring leg 71 and the spring absorbs the vibrations so that no low level, high frequency noise can be heard.

In the operation of the device as shown in the drawings, the primary winding 15 is always energized from the line wires 17 and 18 or other suitable source of power. With the thermostat 66 in position separating its contact 68 from contact 65, the circuit for the secondary winding 16 is open and this winding is not energized. At this time the magnetic flux established by energization of the primary winding or coil 15 passes through the legs 11, 12, 13, and 14 of the core 10, and very little flux passes through the air gap 33, for example, from the magnetic sleeve 32 of the member 21 to the magnetic sleeve section 23.

When, however, for example, the temperature to which thermostat 66 is responsive falls, the thermostat closes the contact 68 into engagement with contact 65. This closes the circuit of the secondary winding 16, and current is induced in this winding by the energization of the primary winding 15. This current induces a magnetic flux which opposes the magnetic flux established in leg 13 by the primary winding 15. As a result the flux established by the winding 15 is diverted, for example, through the magnetic member 21, sleeve portion 32 thereof, through air gap 33 to magnetic sleeve member 23, and through this member back through the leg 14 of the core 10.

Since the sleeve 34 is, in effect, a closed loop of good conductivity, there is induced in sleeve 34 an alternating current of opposite polarity to that impressed upon the winding 15. This alternating current so induced in turn induces an alternating flux field about the sleeve 34. The polarity of at least a portion of the field thus induced opposes the magnetic flux established by the energization of the winding 15. As a result the sleeve 34 is repulsed or repelled outwardly or to the right (Figure 2) out of the air gap 33. This causes movement of the actuator nut 37 and actuating member 36 to the right from the position shown in Figure 2.

As the sleeve 34 moves to the right, the nut 37 and stem 38 move to the right with the sleeve 34 and the nut 37 strikes the head at the outer end of the stem 44 and swings the crank 46 clockwise (Figure 2) with accompanying clockwise rotation of the shaft 50. The lost motion between the nut 37 and stem 44 provides for engaging the stem 44 with a hammer blow effect, which overcomes any friction, sticking, or holding of the valve 54 closed, and initiates the opening movement of the valve 54. The pin 48, which moves to the right with the actuating member 36, travels freely in the slot 49 until the nut 37 strikes the head of the stem 44.

It will be noted that the mechanical advantage between the nut 37 and the head of the stem 44 relative to the rotatable shaft 50 is considerably greater than the mechanical advantage between the pin 48 and the upper surface of the slot 49 as the device is shown in Figure 2. Hence in initiating opening of the valve 54 operated by the shaft 50, a high mechanical knock off force is obtained through the linkage mechanism. After the valve 54 is unseated, less force is required to move it to its fully opened position. Accordingly, the pin 48 strikes the upper inclined surface 73 of the slot 49 to impart with a given movement of the actuating member 36 increased swinging movement to the crank 46, and thereby increased and faster movement of the valve to its fully opened position is obtained.

When the valve 54 reaches its fully opened position it will stay in such open position as long as magnetic flux, or at least sufficient magnetic flux, passes through the gap 33 to maintain the sleeve 34 in its repulsed or repelled position.

When thermostat 66 disengages contact 68 from contact 65, the magnetic flux established by energization of the winding 15 is again short-circuited through core legs 11, 12, 13, and 14, and very little flux will exist in the air gap 33. Hence the spring 62 will then move the guide stem 38, and accordingly the sleeve 34, actuating member 36, and nut 37 toward the left as the device is shown in Figure 2. In such movement the pin 48 engages the lower surface of the slot 49 and causes rapid motion of the valve 54 in valve closing direction. After a predetermined motion toward closed position or just short of fully closed position, the head of the stem 44 is engaged by the hook 56 of the actuating member 36. This produces a final closing force with a hammer effect and mechanical advantage similar to the knock off opening action between the nut 37 and stem 44 to complete the closing of the valve with a relatively great force.

While I have shown and described a flux diverting secondary winding 16 and associated core portion, it is to be understood that the secondary winding 16 and the cooperating core portion may be omitted within the scope of the present invention. In such case the thermostat or other means may be placed directly in the circuit between the primary winding and the line conductors 17 and 18. This will provide a line voltage device which is rendered operable by energization of the primary winding 15 and rendered inoperable by opening the circuit for the primary winding.

In the operation of the valve 54 to open position, the pin 48 moves into contact with the free leg 71 of the V-shaped portion of the spring 70. As a result, when the valve 54 is open, the spring 70 absorbs vibrations, and there will not be any low level, high frequency noise such as may otherwise occur by vibration of the pin 48 against the upper inclined surface at the outer end of the slot 49. The spring 70, instead of engaging the pin 48, may engage the outer surface of the slotted portion of the crank 46 to absorb the vibrations for the purpose set forth.

An annular or O-shaped ring 100 (Figure 3) of neoprene or other material which is resistant to gaseous hydrocarbons fits in an annular groove 101 in the shaft 50, and by cooperation with the shaft 50 and with the inner periphery of the opening 101 in the member 7 forms a gas seal for preventing leakage of gas out along the shaft 50 from the interior of the valve body 1. The "O" or ring seal 100 has negligible rotational friction.

As shown more particularly in Figures 2 and 3, the electromagnetic control device is enclosed within a housing 102 which may be removably secured in place to the plate or member 7, for example, by screws 103. The sides of the housing 102 may have longitudinal corrugations or folds 104, and the outer surface of the housing 102 may have louvers or openings 105.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

I claim:

1. An electromagnetic operator comprising, in combination, an outer magnetically permeable sleeve, an inner magnetically permeable sleeve disposed within and coaxial with said outer sleeve with an annular air gap therebetween, means for producing magnetic flux in said sleeves and across said air gap, a non-magnetic and electric conducting sleeve disposed between said inner and outer sleeves, said nonmagnetic and electric conducting sleeve being movable rectilinearly in one direction in said air gap by reaction of electric current induced in said non-magnetic and electric conducting sleeve with magnetic flux across said air gap, said non-magnetic and electric conducting sleeve having a reduced neck projecting beyond the adjacent end of said inner sleeve, an actuating head on said reduced neck, a guide stem carried at one end by said reduced neck beyond said adjacent end of said inner sleeve for rectilinear movement with said non-magnetic and electric conducting sleeve and projecting coaxially into said inner sleeve, a first bearing for said guide stem carried internally within the adjacent end of said inner sleeve, a second bearing for said guide stem carried by said stem in spaced relation to said first bearing and coacting with the inner surface of said inner sleeve, and a spring coiled about said stem and within said inner sleeve and coacting at opposite ends with said bearings to bias said non-magnetic and electric conducting sleeve rectilinearly in the opposite direction.

2. An electromagnetic operator comprising, in combination, an outer magnetically permeable sleeve, an inner magnetically permeable sleeve disposed within and coaxial with said outer sleeve with an annular air gap therebetween, means for producing magnetic flux in said sleeves and across said air gap, a non-magnetic and electric conducting sleeve disposed between said inner and outer sleeves, said non-magnetic and electric conducting sleeve being movable rectilinearly in one direction in said air gap by reaction of electric current induced in said non-magnetic and electric conducting sleeve with magnetic flux across said air gap, said non-magnetic and electric conducting sleeve having a reduced neck projecting beyond the adjacent end of said inner sleeve, an actuating head on said reduced neck, a guide stem carried at one end by said reduced neck beyond said adjacent end of said inner sleeve for rectilinear movement with said non-magnetic and electric conducting sleeve and projecting coaxially into said inner sleeve, a first bearing for said guide stem carried internally within the adjacent end of said inner sleeve, a second bearing for said guide stem carried by said stem in spaced relation to said first bearing and coacting with the inner surface of said inner sleeve, a spring coiled about said stem and within said inner sleeve and coacting at opposite ends with said bearings to bias said non-magnetic and electric conducting sleeve rectilinearly in the opposite direction, and operator means comprising a pivoted arm projecting into the path of rectilinear movement of said actuating head and spaced from said head when said non-magnetic and electric conducting sleeve is in its biased position to provide lost motion between said actuating head and said arm for engagement of said actuating head with said arm with a hammer blow effect in the rectilinear movement imparted to said non-magnetic and electric conducting sleeve by reaction of electric current induced in said sleeve with magnetic flux across said air gap.

3. An electromagnetic operator comprising, in combination, an outer magnetically permeable sleeve, an inner magnetically permeable sleeve disposed within and coaxial with said outer sleeve with an annular air gap therebetween, means for producing magnetic flux in said sleeves and across said air gap, a non-magnetic and electric conducting sleeve disposed between said inner and outer sleeves, said non-magnetic and electric conducting sleeve being movable rectilinearly in one direction in said air gap by reaction of electric current induced in said non-magnetic and electric conducting sleeve with magnetic flux across said air gap, said non-magnetic and electric conducting sleeve having a reduced neck projecting beyond the adjacent end of said inner sleeve, an actuating head on said reduced neck, a guide stem carried at one end by said reduced neck beyond said adjacent end of said inner sleeve for rectilinear movement with said non-magnetic and electric conducting sleeve and projecting coaxially into said inner sleeve, a first bearing for said guide stem carried internally within the adjacent end of said inner sleeve, a second bearing for said guide stem carried by said stem in spaced relation to said first bearing and coacting with the inner surface of said inner sleeve, a spring coiled about said stem and within said inner sleeve and coacting at opposite ends with said bearings to bias said non-magnetic and electric conducting sleeve rectilinearly in the opposite direction, operator means comprising a pivoted arm projecting into the path of rectilinear movement of said actuating head and spaced from said head when said non-magnetic and electric conducting sleeve is in its biased position to provide lost motion between said actuating head and said arm for engagement of said actuating head with said arm with a hammer blow effect in the rectilinear movement imparted to said non-magnetic and electric conducting sleeve by reaction of electric current induced in said sleeve with magnetic flux across said air gap, an actuating linkage connection between said non-magnetic and electric conducting sleeve and said operator means for imparting increased and faster movement to said operator means after initial movement thereof by said actuating head, and means for absorbing vibrations in said linkage connection to eliminate noise in said connection.

4. An electromagnetic operator comprising, in combination, an outer magnetically permeable sleeve, an inner magnetically permeable sleeve disposed within and coaxial with said outer sleeve with an annular air gap therebetween, means for producing magnetic flux in said sleeves and across said air gap, a non-magnetic and electric conducting sleeve disposed between said inner and outer sleeves, said non-magnetic and electric conducting sleeve being movable rectilinearly in one direction in said air gap by reaction of electric current induced in said non-magnetic and electric conducting sleeve with magnetic flux across said air gap, said non-magnetic and electric conducting sleeve having a reduced neck projecting beyond the adjacent end of said inner sleeve, an actuating head on said reduced neck, a guide stem carried at one end by said reduced neck beyond said adjacent end of said inner sleeve for rectilinear movement with said non-magnetic and electric conducting sleeve and projecting coaxially into said inner sleeve, a first bearing for said guide stem carried internally within the adjacent end of said inner sleeve, a second bearing for said guide stem carried by said stem in spaced relation to said first bearing and coacting with the inner surface of said inner sleeve, a spring coiled about said stem and within said inner sleeve and coacting at opposite ends with said bearings to bias said non-magnetic and electric conducting sleeve rectilinearly in the opposite direction, a pivoted operator having a slot therein and an arm projecting into the path of rectilinear movement of said actuating head and spaced from said head when said non-magnetic and electric conducting sleeve is in its biased position to provide lost motion between said actuating head and said arm for engagement of said actuating head with said arm with a hammer blow effect in the rectilinear movement imparted to said non-magnetic and electric conducting sleeve by reaction of electric current induced in said sleeve with magnetic flux across said air gap, a pin carried by the reduced neck of said non-magnetic and electric conducting sleeve, said pin operating in the slot in said pivoted operator and coacting with said operator for imparting, after initial movement of said operator by said actuating head, increased and faster movement to said operator, and a spring carried by said operator and coacting with said pin to absorb vibrations and eliminate noise in the operator actuating connection afforded by said pin and operator.

5. In a device of the class described, in combination, a rectilinearly movable actuator having a retracted position and operable to projected position, a pivoted operator having a slot a portion of which extends generally in the direction of the rectilinear movement of said actuator, said slot having an angular portion with a surface inclined with respect to the direction of rectilinear movement of said actuator, a pin carried by said actuator and operating in said slot, said pin coacting with said inclined surface after initial movement of said actuator to impart by said rectilinear movement of said actuator pivotal movement to said pivoted operator, and a spring carried by said pivoted operator and coacting after initial actuation of said pivoted operator with a part carried by said actuator to absorb vibrations and eliminate noise in the actuating connection afforded by said pin and inclined surface.

6. A device according to claim 5 wherein said spring is of generally V-shaped form with a free angular leg disposed generally in the direction of said inclined surface of said slot.

7. A device according to claim 5 wherein said pivoted operator has an arm projecting into the path of rectilinear movement of said actuator and spaced from said actuator when the actuator is in retracted position to provide lost motion between said actuator and said arm for engagement of said actuator with said arm with a hammer blow effect in the rectilinear movement of said actuator.

References Cited in the file of this patent

UNITED STATES PATENTS

| Number | Name | Date |
|---|---|---|
| 308,129 | Baffum | Nov. 18, 1884 |
| 370,573 | Thomson | Sept. 27, 1887 |
| 1,439,693 | Coates | Dec. 26, 1922 |
| 1,547,133 | Strickland | July 21, 1925 |
| 1,817,943 | Rockwell | Aug. 11, 1931 |
| 1,923,681 | McCabe | Aug. 22, 1933 |
| 1,979,127 | Warrick | Oct. 30, 1934 |
| 1,980,736 | Trofimov | Nov. 13, 1934 |
| 2,051,938 | Carlson | Aug. 25, 1936 |
| 2,082,210 | McMaster | June 1, 1937 |
| 2,155,358 | Cyr | Apr. 18, 1939 |
| 2,360,945 | Garner | Oct. 24, 1944 |
| 2,414,508 | Craig | Jan. 21, 1947 |
| 2,437,536 | Johnson | Mar. 9, 1948 |
| 2,529,533 | Almond | Nov. 14, 1950 |